United States Patent
McKague, Jr. et al.

[15] 3,663,783
[45] May 16, 1972

[54] SAFETY LOAD AND TEMPERATURE CONTROL SYSTEM FOR MICROWAVE OVENS

[72] Inventors: Elbert L. McKague, Jr., Fort Worth; Walter C. Cooper, Jr., Hurst, both of Tex.

[73] Assignee: The United States of America as represented by the Secretary of the Army

[22] Filed: Dec. 7, 1970

[21] Appl. No.: 95,783

[52] U.S. Cl. ....................................................219/10.55
[51] Int. Cl. .......................................................H05b 9/06
[58] Field of Search............................................219/10.55

[56] References Cited

UNITED STATES PATENTS

| | | | |
|---|---|---|---|
| 3,365,562 | 1/1968 | Jeppson | 219/10.55 |
| 3,549,848 | 12/1970 | Williams | 219/10.55 |
| 2,398,606 | 4/1946 | Wang | 219/10.55 X |
| 3,335,253 | 8/1967 | Jeppson et al. | 219/10.55 |
| 3,474,210 | 10/1969 | Gilbermann et al. | 219/10.55 |

Primary Examiner—J. V. Truhe
Assistant Examiner—Hugh D. Jaeger
Attorney—Charles K. Wright, Jr., William G. Gapcynski, Lawrence A. Neureither, Leonard Flank, Jack W. Voigt and Harold W. Hilton

[57] ABSTRACT

A safety load and temperature control system for microwave ovens wherein a variable volume of water is passed through the oven for controlling the amount of energy received by a work piece therein. Microwave energy from magnetron tubes is introduced into the oven chamber for processing a work piece. The variable supply of water within the chamber is increased for small parts being cured and decreased for large parts being cured. The water is passed through a dielectrically transparent vessel within the chamber and is heated by the microwave energy proportional to the heated work piece or part. The temperature of the water leaving the chamber is indicative of the rate of change of the work piece temperature. A temperature controller has upper and lower limits that increase or decrease the water in the chamber and passing therethrough to maintain the work piece heating rate within a desired range. The variable supply of water also serves as a dummy load to absorb excessive radiant energy, preventing destructive feedback to the magnetron tubes. Microwave filters at water inlet and outlet ports keep the high frequency energy within the chamber.

13 Claims, 4 Drawing Figures

Patented May 16, 1972

Elbert L. McKague, Jr.
Walter C. Cooper, Jr.
INVENTORS.

BY Jack W. Voigt
Harold W. Hilton

Elbert L. McKague, Jr.
Walter C. Cooper, Jr.
INVENTORS.

BY *Jack W. Voigt*

*Harold W. Hilton*

SAFETY LOAD AND TEMPERATURE CONTROL SYSTEM FOR MICROWAVE OVENS

BACKGROUND OF THE INVENTION

Microwave energy is useful in commercial and industrial applications where it is desired to rapidly cure, sterilize, or dry a particular work piece or part. Uses for microwave heating include rapid preparation of frozen foods, sterilization of tools and foods, curing of plastics and ceramics and flame spectroscopy. In an assembly line operation, parts can automatically be carried through a microwave heating chamber for processing. In microwave radiation for heating, the high frequency electric field energy changes to heat through the dielectric loss of the work piece. The heat generated in a work piece increases or decreases in proportion to the microwave frequency and the square of the electric field strength.

At higher microwave frequencies, the magnetron tube is employed as a high frequency generator for microwave ovens. To prevent damage of the magnetron tube, high levels of reflected energy must be avoided. Existing ovens rely on the operator for assurance that a power absorbing load adequate to prevent magnetron tube damage is in the oven during operation. This power load is normally the work piece itself. When a work piece of small size is placed in a microwave oven, it may absorb only a small amount of the output energy, allowing feedback to occur which damages the magnetron tubes. Safety loads of stagnant water or resinous materials have been used to supplement a small work piece load. However, stagnant water rapidly boils away and resinous materials, often heated to deterioration, produce undesirable vapors. Further, a particular oven with a set output of energy produces differenct temperature rise rates in different work parts, depending on the part weight and other factors.

SUMMARY OF THE INVENTION

This invention relates to a microwave oven having a variable and automatic safety load and temperature control system. The time required to cure a work part in a microwave oven is controlled by controlling the temperature rise rate within the oven. In production operation, for a known weight and specific heat of the material being cured, the temperature control can be automated by setting machine limits for temperatures which are predetermined from oven calibration. Electronic circuitry activates magnetron tubes that inject microwave frequency energy into an inclosed metallic cabinet. Microwave radiation is contained within the metallic chamber with the chamber load or work piece absorbing the energy therin. A safety load of flowing water has a varying volume passing through the chamber which controls the amount of energy absorbed by the work piece and hence the temperature rise rate therof. The water flows through a dielectrically transparent vessel within the microwave oven. Flowmeter valves adjust the amount of water inside the oven in response to water temperature sensors.

An object of the present invention is to provide a variable dummy load for a microwave oven, allowing various sizes and materials to be processed through the oven chamber while protecting the power equipment.

Another object of the present invention is to provide a controlled energy density within a microwave oven for controlling the time of cure of a part therein.

Still another object of the present invention is to provide a temperature control for a microwave oven that is also a safety load for the oven.

DESCRIPTION OF THE PREFERRED EMBODIMENT

Continuous safe operation of microwave ovens requires a power absorbing material inside the oven cabinet to prevent build up of excessive concentrations of energy. With inadequate power absorbing material in an oven, high energy standing waves are formed and microwave energy is fed back into the magnetron tubes, shorting them out. Standing waves may also form in such a way as to cause excessive heat development in the magnetron tube, resulting in rapid tube damage.

When a microwave oven is to be operated for a long period of time (10 minutes or more), it is not practical to use a solid stationary material to absorb power, because the increasing temperatures degrade the material. Plastic power absorbers liberate offensive fumes as temperatures rise. A flowing liquid such as water that absorbs power provides a capability for curing parts with uninterrupted, nonhazardous operation.

Figure 1:
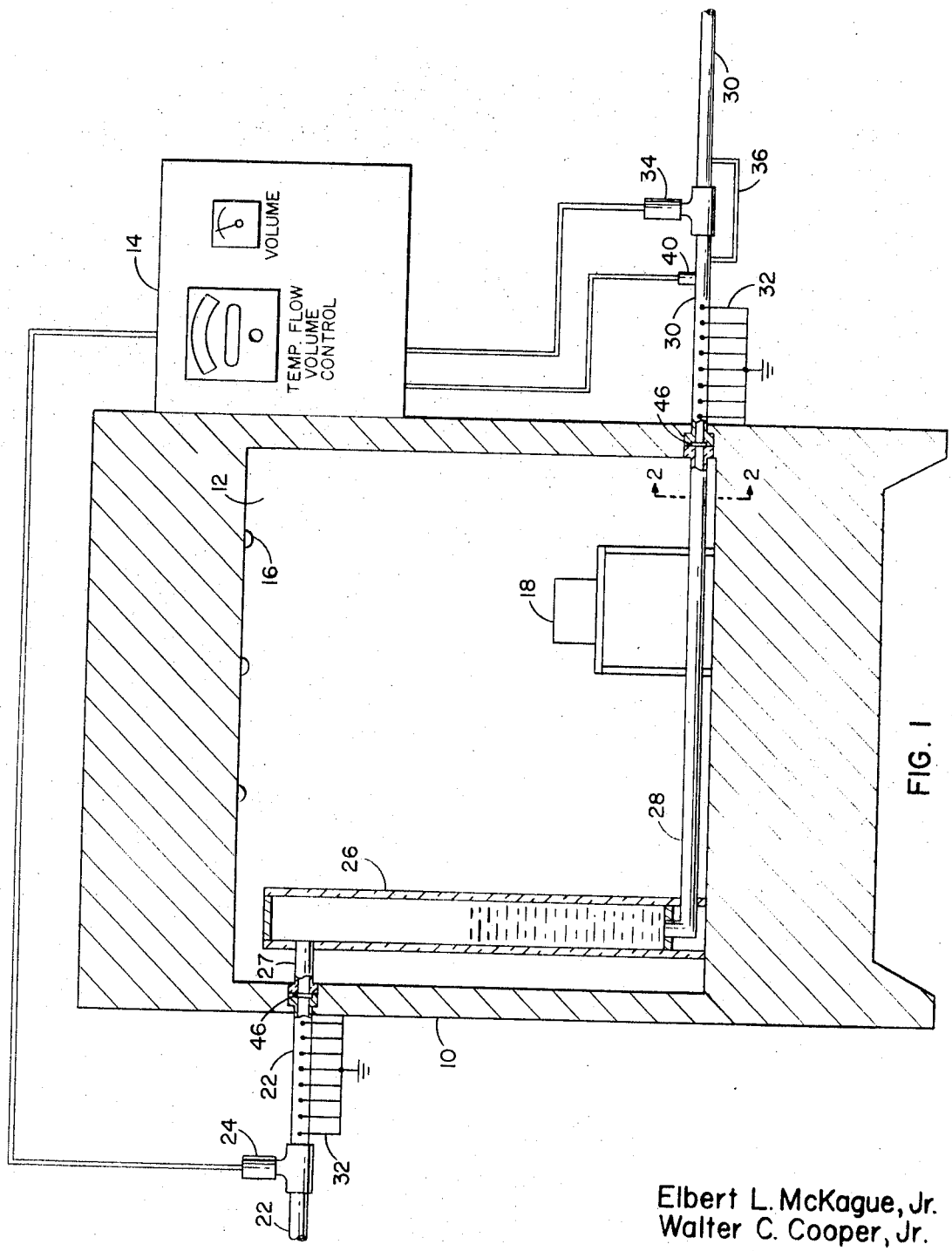
FIG. 1 is a diagrammatic view, partially in section, of a preferred embodiment of the invention.

Referring now to the drawings wherein like numbers represent like parts in the figures, FIG. 1, discloses apparatus representing a first embodiment of a microwave oven having a safety load and control system. A microwave oven 10 has a metal microwave chamber 12 therein and a control panel 14 adjacent a side of the oven. A plurality of magnetron tubes 16 direct microwave energy from the chamber ceiling toward a work piece 18 supported within the chamber. A liquid such as water is introduced into chamber 12 at a known temperature through a metal flow-meter-controlled pipe 22, which is attached to the chamber wall of the oven. A control valve 24 in pipe 22 is connected to control panel 14 and may be operated conventionally as by an electrical or pressure servo system to control the volume of water passing therethrough. A fluid vessel 26 within chamber 12 is connected at one end to an input pipe 27 and at another end to an outlet pipe 28. The inlet pipe, outlet pipe and fluid vessel, which may be glass, are dielectrically transparent to the microwave energy introduced into the chamber. Inlet pipe 27 is connected to metal pipe 22 for passing a large volume of water through the pipes and into vessel 26. Similarly a metal drainage pipe 30 is connected to the chamber wall of oven 10 and is joined by conventional methods to glass outlet pipe 28 for passing water from vessel 26 to the outside of chamber 12. Water is flowed through the glass pipe and vessel, being heated by the microwaves during operation and thereby serving as a safety or dummy load for the oven. Microwave energy is absorbed and converted to heat by the work piece 18 and by the dummy load, the water within vessel 26. Microwave energy may be repeatedly reflected in the chamber with waves passing through the load releasing energy as heat to cure the work piece. The dummy load absorbs excessive relfections and radiation reducing damaging feedback of energy to the magnetrons.

Due to the high attenuation factor in water there is little if any tendency for pipes 22 and 30 to act as a waveguide for the microwave energy. However, grounding pins 32 are incorporated in metal pipes 22 and 30 at periodic intervals to further protect against any tendency of the pipes to produce a waveguide effect. A flow meter valve 34 on outlet pipe 30, when operated in conjunction with inlet valve 24, adjusts and controls the amount of water inside the oven. The amount of water in vessel 26 is increased by opening inlet flow valve 24 more than exit flow valve 34 is opened. Both valves are partially open at all times allowing continuous flow of water through the oven to prevent development of boiling temperature in the water.

A thermocouple probe 40, temperatue sensor, is inserted into pipe 30 to measure the temperature of the stream of water exiting oven 10 for providing an indication of both the power absorbed by the safety water load and the power absorbed by the part. A signal from thermocouple 40 activates a servo-control within control panel 14 to increase the volume of water in the oven by increasing the opening of valve 24 if the exit water temperature exceeds a preselected value. When exit water temperature exceeds the preselected value, the heating rate of the work piece is excessive. With the volume of water in vessel 26 increased the outflow temperature begins to drop and the volume of water adjusts as the servo system seeks to maintain the preselected temperature of the exiting water.

Similarly, the volume of water in vessel 26 is decreased if the temperature of exiting water falls below a preselected value, causing the thermocouple to actuate a servo-control for outlet flow-meter valve 34. This thermocouple control operates similarly to a thermostat and various flow control methods may be employed in accordance with the load characteristics. The initial volume of water supplied through valve 24 is preselected in accordance with a desired cure time and temperature for the work piece. The volume of water required in vessel 26 can be controlled by a float meter within the vessel or by establishing a selected differential between inlet and outlet water flow for a specific period of time, followed by equalization of the flow rates. A continuous drain line 36 may be connected around valve 34 to allow a predetermined minimum water flow through pipes 30, which also allows valve 34 to function as a fine adjustment in temperature control.

The time required to cure a work piece such as a plastic part in oven 10 is controlled by controlling the temperature rise rate. For a known weight and specific heat of the material to be cured, the oven limits for temperature are calibrated and set, allowing automatic control of the part being cured. The power absorbing safety load of water inside chamber 12 prevents buildup of excessive concentrations of microwave energy. Without adequate power absorbing material in the oven, high energy standing waves are formed and microwave energy is fed back into the magnetron tubes, resulting in rapid tube damage. Thus a microwave oven safety load is provided that simultaneously provides control of the work piece temperature rise rate.

Figure 2:
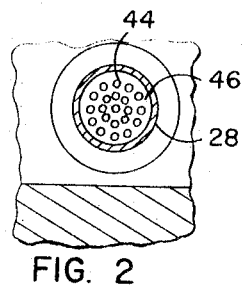
FIG. 2 is a sectional view taken along the lines 2—2 of FIG. 1.

As noted in FIGS. 1 and 2, the inner oven wall in the region inclosed by the inside diameter (ID) of pipes 22 and 30 has a plurality of very small diameter holes 44. Holes 44 form a perforated screen 46 through which a large volume of water can flow. Screens 46 are electrically grounded, being part of the oven closure and the microwave energy is reflected thereby. Each hole 44 is approximately 0.010 inches in diameter to prevent leakage of the energy through the water filled hole. Glass pipes 27 and 28 inclose the areas of perforation inside the oven wall, guiding the flow of water therethrough. Forming a part of the oven wall, screens 46 prevent the microwave energy from escaping the chamber and can be used instead of using grounding pins 32 or in addition thereto.

The effective diameter of a hole filled with a dielectric material is enlarged with respect to passage of microwave energy therethrough. The effective diameter of pipes 22 and 30 is enlarged by the factor of the square root of the dielectric coefficient of the material (water) at the intended frequency of the energy. The dielectric coefficient of water is about 80 and the effective diameter of a hole through which water might flow is $\sqrt{80}$ or approximately 9 times the actual diameter. To prevent leakage of energy the hole must be less than one quarter wave length in effective size. The actual possible diameter of holes 44 is $$\frac{1/4\lambda \text{ at } F_o}{\sqrt{80}}.$$

For $F_o = 2,450$ Megacycles, $\frac{1}{4}\lambda = 1.20$ inches and the maximum possible diameter is approximately $(1.20 \text{ in.})/9 = 0.133$ in., or slightly larger than ⅛ inch. Thus 0.010 inch is well below the maximum diameter that prevents leakage of energy through the holes 44.

Figure 3:
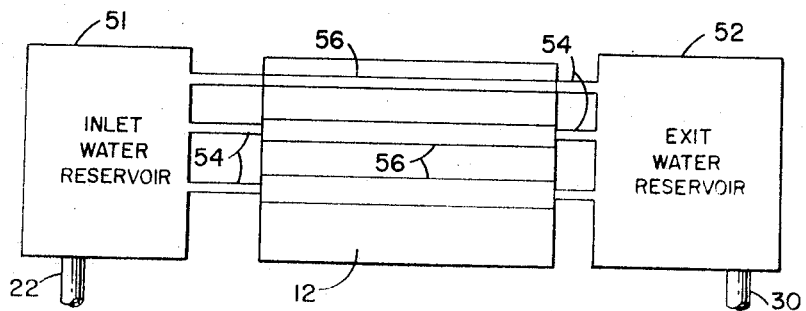
FIG. 3 is an elevational view of a microwave oven with inlet and outlet reservoirs of water to prevent energy leakage.

If inlet pipe 22 is completely sealed and grounded to the oven wall, the diameter of the inlet pipe need not be restricted when the pipe leads into a metal-inclosed water reservoir large enough to attenuate or absorb all energy that escapes into the pipe. FIG. 3 discloses a metal inlet water reservoir 51 and outlet reservoir 52 having a plurality of input and output metal pipes 54 connected to microwave oven 10. A plurality of glass pipes 56 within the oven chamber 12 connect to respective input and output pipes 54 and pass water therethrough to absorb the excessive radiant energy. Several diameters of glass pipes allow large variations in the quantity of water passing through the curing chamber, providing load and temperature control by filing only the number of glass tubes needed to control the temperature for the particular size of work piece.

Figure 4:
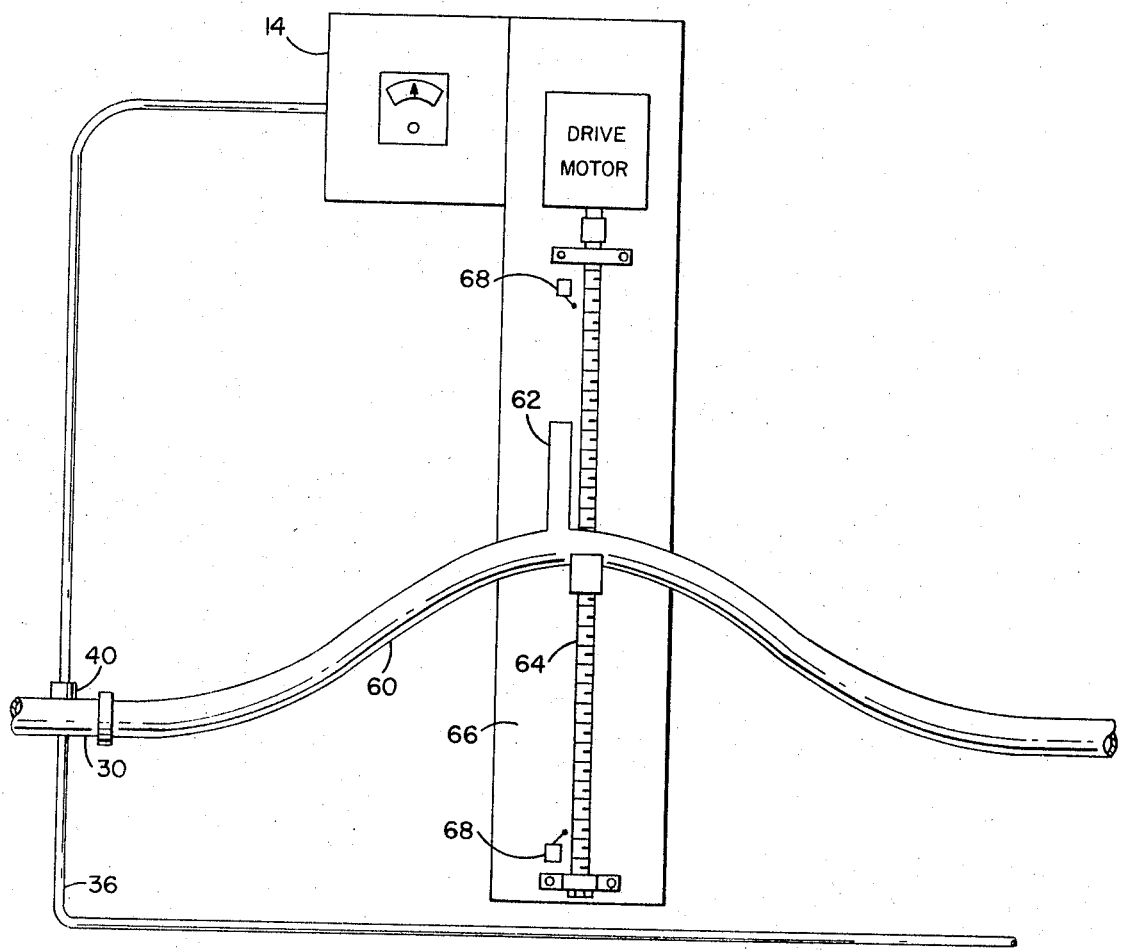
FIG. 4 is an elevational view of an alternative volume control for varying the water level within the chamber.

The servo-controlled flow meter valves can be eliminated by using a constant rate of water flow into the oven. Valve 24 is manually set to allow the constant rate of water flow, filling dielectrically transparent vessel 26 to some level. Water is gravity drained from vessel 26 through outlet pipes 28 and 30 that are large enough in diameter to assure a draining rate capability greater than the filling rate. As shown in FIG. 4, a transparent flexible hose or tube 60 is connected to the drain end of metal pipe 30 outside the oven wall. Pipe 30 extends from the oven a distance great enough to prevent radiation of microwave energy therefrom. Drain line 36 provides a constant trickle path around hose 60, insuring a minimum drainage rate for vessel 26. A transparent stand pipe 62 is connected in hose 60 near the junction of pipe 30 and the hose. Stand pipe 62 is taller than the height of the vessel in the oven and is at the apex of the flexible hose to prevent siphoning of the vessel. The height of the apex of hose 60 is changed to promote or restrict gravity induced flow of water from vessel 26. Thermocouple 40 senses the outlet water temperature and passes an output signal to control panel 14 for raising or lowering the flexible hose as needed to maintain a specific temperature in vessel 26. Hose 60 is raised or lowered by motor driven elevator screw 64 and is adjacent a fixed backboard or support post 66, having volume graduations thereon for indicating the volume of water in the chamber. Stand pipe 62 can be used to guide the manual presetting of initial water volume. Upper and lower safety switches 68 on support post 66 prevent screw 64 from being driven beyond safety limits.

Thus a safety load and temperature control system is disclosed for microwave ovens wherein water is passed through an oven chamber and outlet water temperature is monitored. The monitored outlet temperature is used to control water volume within the chamber. An upper limit control on the temperature controlling device prevents equipment damage and varying the volume of water in the chamber and the time therein provides various heating rates for work pieces.

At the lower safety switch limit maximum water is flowing through drain hose 60, rapidly replacing the volume of water in vessel 26 for maximum heat transfer from the system. At the upper safety switch limit, water flow is only through drain line 36, restricting gravity induced flow of water from the vessel.

Obviously many modifications and variations of the present invention are possible in light of the above teachings. For example radiation from the inlet and outlet metal pipes can be prevented by crumpled metal foil around the pipes or by one or more 90° bends in the pipe at points corresponding to half-wave lengths of the radiant energy. The stand pipe can be transparent, graduated and employed with a non-transparent hose. It is therefore to be understood that within the scope of the apended claims the invention may be practiced otherwise than as specifically described herein.

We claim:

1. A safety load and temperature control system for microwave ovens used in curing various sizes of work pieces, comprising: a microwave chamber housing having metal chamber walls for reflecting microwave energy within said chamber, a microwave emitting source within said chamber, first and second opeings through opposing chamber walls, first and second liquid conducting metal pipes external to said oven and having respective first ends thereof inserted through said openings and sealed to the inner wall of said chamber for coupling a variable volume of liquid into said chamber, means communicating with said first and second metal pipes for conveying said volume of liquid through said chamber for providing a variable safety and dummy load and temperature control for said chamber, control means for varying said volume of liquid conveyed to and from said chamber and heat responsive means for measuring the temperature of said liquid leaving said chamber.

2. A safety load control system for microwave ovens as set forth in claim 1 wherein said conveying means is a microwave frequency dielectrically transparent vessel within said chamber having dielectrically transparent input and output tubes, said input tube being joined to said first chamber wall opening and pipe therethrough for conveying said liquid into said vessel, said output tube being connected to drain said vessel and joined to said second opening and metal pipe for conveying said liquid out of said vessel and chamber.

3. A safety load control system as set forth in claim 2 wherein said heat responsive means is a thermocouple in said second metal drain pipe external to said microwave oven.

4. A safety load control system as set forth in claim 3 wherein said control means comprises an inlet control valve in said first metal pipe and an outlet control valve in said second metal pipe for increasing and decreasing the liquid volume level within said vessel for controlling the temperature within the chamber.

5. A safety load control system as set forth in claim 4 wherein said control means further comprises a control panel having a servo system control with an input connected to an output of said thermocouple for responding to said liquid temperature changes, said servo system having first and second outputs coupled to said input and output valves respectively for automatically operating said control valves.

6. A safety load control system as set forth in claim 5 wherein said inlet and outlet metal pipes are grounded to said microwave oven to prevent microwave energy from escaping said chamber.

7. A safety load control system as set forth in claim 5 and further comprising a metal screen forming the ends of said first and second metal pipes, said screens having a plurality of holes therein, said holes having a diameter less than a quarter of a wave length of the microwave energy from said source, and wherein said liquid is water and said vessel and tubes are glass.

8. A safety load control system as set forth in claim 1 wherein said liquid is water and further comprising a plurality of dielectric transparent vessels within said chamber, a plurality of input and output metal pipes communicating into said chamber for conveying water into and out of respective said vessels, metal inlet and exit water reservoirs adjacent said oven and connected to said metal pipes for conveying water to and from said microwave chamber while absorbing energy leakage from said chamber, and said vessels being tubular glass of unequal diameter.

9. A safety load control system as set forth in claim 3 and further comprising a flexible hose connected to the other or drain end of said second metal pipe for draining said vessel, a motor driven elevator screw connected for raising and lowering said hose to restrict or promote liquid flow therethrough, a support post for said elevator screw and a transparent stand pipe connected in said hose at the apex of the hose for indicating the volume of water within said chamber, and said control means being responsive to an output signal of said thermocouple for activating said motor driven screw.

10. A safety load control system as set forth in claim 9 wherein said liquid is water and said vessel and tubes are glass, said outlet tube and metal pipe having a diameter that provides a drainage rate greater than the input filling rate of the vessel for gravity drainage thereof.

11. The method of curing various sizes of work pieces within a microwave oven that provides a variable safety load and temperature control system for the oven, said oven including a curing chamber and a dielectrically transparent vessel within said chamber, comprising the steps of:
placing a work piece to be cured within said oven chamber,
passing a liquid through said vessel for providing a dummy or safety load within said chamber,
radiating microwave energy into said chamber for curing said work piece,
measuring the temperature of liquid exiting said chamber, and
adjusting the volume of said liquid passing through the chamber in response to variations in the measured temperature for providing a safety load that absorbs excessive radiant energy and controls the rate of heating of said work piece within said chamber.

12. The method of heating work pieces within a microwave oven that provides a variable safety load and temperature control as set forth in claim 11, comprising the steps of:
increasing and decreasing the volume of said liquid passing through the chamber in response to respective increases and decreases of the measured temperature, and
passing water through said vessel for providing said safety load.

13. The method of heating work pieces within a microwave oven that provides a variable safety load and temperature control as set forth in claim 12, comprising the steps of:
injecting water into said vessel for providing said safety load,
gravity draining said water from said vessel and chamber,
restricting and promoting water flow from said vessel by elevating or lowering the gravity flow level from said chamber in response to said measured temperature variations.

* * * * *